(12) United States Patent
Domenica et al.

(10) Patent No.: US 9,195,985 B2
(45) Date of Patent: Nov. 24, 2015

(54) METHOD, SYSTEM, AND COMPUTER PROGRAM PRODUCT FOR CUSTOMER-LEVEL DATA VERIFICATION

(75) Inventors: Danielle R. Domenica, Phoenix, AZ (US); Rahul S. Siddharth, New Delhi (IN); Chanderpreet Duggal, Phoenix, AZ (US); Pradeep V. Ramesh, Haryana (IN); Janet L. Biffle, Cave Creek, AZ (US); Kristin Hoyne Gomes, State College, PA (US)

(73) Assignee: III Holdings 1, LLC, Wilmington, DE (US)

( * ) Notice: Subject to any disclaimer, the term of this patent is extended or adjusted under 35 U.S.C. 154(b) by 0 days.

(21) Appl. No.: 11/448,767

(22) Filed: Jun. 8, 2006

(65) Prior Publication Data

US 2007/0284433 A1    Dec. 13, 2007

(51) Int. Cl.
G06Q 40/00 (2012.01)
G06Q 20/40 (2012.01)

(52) U.S. Cl.
CPC ............ *G06Q 20/4016* (2013.01); *G06Q 20/40* (2013.01)

(58) Field of Classification Search
USPC ................ 235/379, 380, 382; 705/44, 35, 39
See application file for complete search history.

(56) References Cited

U.S. PATENT DOCUMENTS

| | | | |
|---|---|---|---|
| 4,864,557 A | 9/1989 | Morton et al. | |
| 5,602,933 A | 2/1997 | Blackwell et al. | |
| 5,648,647 A * | 7/1997 | Seiler | 235/380 |
| 5,696,952 A | 12/1997 | Pontarelli | |
| 5,768,602 A | 6/1998 | Dhuey | |
| 5,812,668 A | 9/1998 | Weber | |
| 5,832,283 A | 11/1998 | Chou et al. | |
| 5,850,446 A | 12/1998 | Berger et al. | |
| 5,913,202 A | 6/1999 | Motoyama | |
| 5,949,045 A | 9/1999 | Ezawa et al. | |
| 5,996,076 A | 11/1999 | Rowney et al. | |
| 6,023,679 A | 2/2000 | Acebo et al. | |

(Continued)

FOREIGN PATENT DOCUMENTS

WO    WO 02/099720 A1 * 12/2002 .............. G06F 17/60

OTHER PUBLICATIONS

USPTO; Office Action dated Aug. 10, 2010 in U.S. Appl. No. 12/205,412.

(Continued)

*Primary Examiner* — Rafferty Kelly
(74) *Attorney, Agent, or Firm* — Meyertons, Hood, Kivlin, Kowert & Goetzel, P.C.

(57) ABSTRACT

A system, method, and computer program to reduce incorrectly declined transactions and improve risk calculation accuracy by reducing error probability during fraud detection. The tool first receives at least one data element as well as transaction account data and/or financial transaction instrument data. Then a customer is determined from a first record associated with the transaction account data and/or financial transaction instrument data. A record search is performed to identify at least one additional record associated with the customer. Finally, the data element is compared to the information contained in the additional record to create a comparison result that verifies a customer address. The comparison result may be used as an input to transaction risk calculations. The comparison result may also be provided to a merchant system and/or merchant for use in a decision-making process, for example, to verify customer identity.

30 Claims, 11 Drawing Sheets

(56) References Cited

U.S. PATENT DOCUMENTS

| | | | |
|---|---|---|---|
| 6,029,154 | A | 2/2000 | Petit |
| 6,160,874 | A | 12/2000 | Dickerman et al. |
| 6,223,289 | B1 | 4/2001 | Wall et al. |
| 6,256,019 | B1 | 7/2001 | Allport |
| 6,347,339 | B1 | 2/2002 | Morris et al. |
| 6,349,335 | B1 | 2/2002 | Jenney |
| 6,374,145 | B1 | 4/2002 | Lignoul |
| 6,463,474 | B1 | 10/2002 | Fuh et al. |
| 6,484,174 | B1 | 11/2002 | Wall et al. |
| 6,490,624 | B1 | 12/2002 | Sampson et al. |
| 6,560,322 | B2 | 5/2003 | Yamaguchi et al. |
| 6,560,711 | B1 | 5/2003 | Given et al. |
| 6,609,154 | B1 | 8/2003 | Fuh et al. |
| 6,615,244 | B1 | 9/2003 | Singhal |
| 6,631,405 | B1 | 10/2003 | Kobata |
| 6,658,393 | B1 | 12/2003 | Basch et al. |
| 6,732,919 | B2 * | 5/2004 | Macklin et al. ............... 235/380 |
| 6,926,203 | B1 | 8/2005 | Sehr |
| 6,999,943 | B1 | 2/2006 | Johnson et al. |
| 7,024,556 | B1 | 4/2006 | Hadjinikitas et al. |
| 7,051,002 | B2 | 5/2006 | Keresman et al. |
| 7,100,203 | B1 | 8/2006 | Tosey |
| 7,136,835 | B1 | 11/2006 | Flitcroft et al. |
| 7,331,518 | B2 * | 2/2008 | Rable ............................ 235/380 |
| 7,337,210 | B2 | 2/2008 | Barsness |
| 7,640,185 | B1 | 12/2009 | Giordano et al. |
| 7,660,756 | B2 | 2/2010 | Nakamura et al. |
| 7,904,332 | B1 | 3/2011 | Merkley et al. |
| 8,214,292 | B2 | 7/2012 | Duggal et al. |
| 2002/0035548 | A1 | 3/2002 | Hogan et al. |
| 2002/0052852 | A1 | 5/2002 | Bozeman |
| 2002/0091554 | A1 | 7/2002 | Burrows |
| 2002/0138418 | A1 | 9/2002 | Zarin et al. |
| 2002/0165954 | A1 | 11/2002 | Eshghi et al. |
| 2002/0174065 | A1 | 11/2002 | Coward |
| 2002/0174335 | A1 | 11/2002 | Zhang et al. |
| 2002/0188573 | A1 | 12/2002 | Calhoun |
| 2003/0061157 | A1 * | 3/2003 | Hirka et al. ..................... 705/39 |
| 2003/0105707 | A1 | 6/2003 | Audebert et al. |
| 2003/0120615 | A1 | 6/2003 | Kuo |
| 2003/0167226 | A1 | 9/2003 | Britton et al. |
| 2003/0195963 | A1 | 10/2003 | Song et al. |
| 2003/0225687 | A1 | 12/2003 | Lawrence |
| 2004/0059930 | A1 | 3/2004 | DiFalco et al. |
| 2004/0167854 | A1 | 8/2004 | Knowles et al. |
| 2004/0232225 | A1 * | 11/2004 | Bishop et al. ................. 235/380 |
| 2005/0108178 | A1 | 5/2005 | York |
| 2005/0240522 | A1 | 10/2005 | Kranzley et al. |
| 2006/0026076 | A1 | 2/2006 | Raymond |
| 2006/0026689 | A1 | 2/2006 | Barker et al. |
| 2006/0106738 | A1 * | 5/2006 | Schleicher .................... 705/401 |
| 2006/0212387 | A1 | 9/2006 | Jensen |
| 2007/0192249 | A1 | 8/2007 | Biffle et al. |
| 2007/0215698 | A1 * | 9/2007 | Perry ............................. 235/380 |
| 2007/0282674 | A1 | 12/2007 | Gomes |
| 2007/0284433 | A1 | 12/2007 | Domenica |
| 2008/0275821 | A1 | 11/2008 | Bishop et al. |
| 2008/0314977 | A1 | 12/2008 | Domenica |
| 2009/0313134 | A1 | 12/2009 | Faith et al. |
| 2010/0100484 | A1 | 4/2010 | Nguyen |
| 2010/0257068 | A1 | 10/2010 | Duggal |

OTHER PUBLICATIONS

USPTO; Final Office Action dated Jan. 24, 2011 in U.S. Appl. No. 12/205,412.
USPTO; Office Action dated Nov. 29, 2012 in U.S. Appl. No. 13/411,299.
USPTO; Office Action dated Dec. 26, 2012 in U.S. Appl. No. 13/411,370.
USPTO; Final Office Action dated Apr. 19, 2013 in U.S. Appl. No. 13/411,299.
USPTO; Final Office Action dated May 20, 2013 in U.S. Appl. No. 13/411,370.
USPTO; Advisory Action dated Jun. 28, 2013 in U.S. Appl. No. 13/411,299.
USPTO; Office Action dated Jun. 5, 2013 in U.S. Appl. No. 11/303,018.
USPTO; Office Action dated Apr. 4, 2008 in U.S. Appl. No. 10/999,570.
USPTO; Final Office Action dated Aug. 5, 2008 in U.S. Appl. No. 10/999,570.
USPTO; Office Action dated Oct. 7, 2008 in U.S. Appl. No. 11/303,018.
USPTO; Advisory Action dated Nov. 28, 2008 in U.S. Appl. No. 10/999,570.
USPTO; Office Action dated Feb. 19, 2009 in U.S. Appl. No. 10/999,570.
USPTO; Final Office Action dated Apr. 29, 2009 in U.S. Appl. No. 11/303,018.
USPTO; Office Action dated Jun. 25, 2009 in U.S. Appl. No. 10/588,811.
USPTO; Final Office Action dated Sep. 1, 2009 in U.S. Appl. No. 10/999,570.
USPTO; Office Action dated Sep. 23, 2009 in U.S. Appl. No. 11/303,018.
USPTO; Final Office Action dated Jan. 6, 2010 in U.S. Appl. No. 10/588,811.
USPTO; Final Office Action dated Jan. 21, 2010 in U.S. Appl. No. 11/303,018.
USPTO; Office Action dated Feb. 2, 2010 in U.S. Appl. No. 10/999,570.
USPTO; Advisory Action Apr. 23, 2010 in U.S. Appl. No. 10/588,811.
USPTO; Advisory Action dated Apr. 23, 2010 in U.S. Appl. No. 11/303,018.
USPTO; Office Action dated Jun. 21, 2010 in U.S. Appl. No. 11/303,018.
USPTO; Final Office Action dated Jul. 10, 2010 in U.S. Appl. No. 10/999,570.
USPTO; Office Action dated Aug. 2, 2010 in U.S. Appl. No. 12/416,675.
USPTO; Office Action dated Aug. 31, 2010 in U.S. Appl. No. 10/588,811.
USPTO; Advisory Action dated Sep. 30, 2010 in U.S. Appl. No. 10/999,570.
USPTO; Final Office Action dated Nov. 1, 2010 in U.S. Appl. No. 12/416,675.
USPTO; Final Office Action dated Dec. 8, 2010 in U.S. Appl. No. 11/303,018.
USPTO; Office Action dated Dec. 27, 2010 in U.S. Appl. No. 10/999,570.
USPTO; Final Office Action dated Feb. 1, 2011 in U.S. Appl. No. 10/588,811.
USPTO; Advisory Action dated Feb. 2, 2011 in U.S. Appl. No. 12/416,675.
USPTO; Advisory Action dated Mar. 2, 2011 in U.S. Appl. No. 11/303,018.
USPTO; Office Action dated Mar. 28, 2011 in U.S. Appl. No. 12/416,680.
USPTO; Office Action dated Apr. 12, 2011 in U.S. Appl. No. 11/303,018.
USPTO; Advisory Action dated Apr. 26, 2011 in U.S. Appl. No. 10/588,811.
USPTO; Final Office Action dated May 25, 2011 in U.S. Appl. No. 10/999,570.
USPTO; Office Action dated Jun. 1, 2011 in U.S. Appl. No. 12/416,675.
USPTO; Advisory Action dated Jul. 29, 2011 in U.S. Appl. No. 10/999,570.
USPTO; Office Action dated Sep. 22, 2011 in U.S. Appl. No. 12/416,675.
USPTO; Office Action dated Sep. 30, 2011 in U.S. Appl. No. 12/416,680.
USPTO; Final Office Action dated Oct. 24, 2011 in U.S. Appl. No. 11/303,018.

(56) References Cited

OTHER PUBLICATIONS

USPTO; Office Action dated Nov. 2, 2011 in U.S. Appl. No. 10/588,811.
USPTO; Office Action dated Dec. 15, 2011 in U.S. Appl. No. 12/416,675.
USPTO; Notice of Allowance dated Mar. 5, 2012 in U.S. Appl. No. 12/416,680.
USPTO; Office Action dated May 4, 2012 in U.S. Appl. No. 11/303,018.
USPTO; Final Office Action dated May 8, 2012 in U.S. Appl. No. 10/588,811.
USPTO; Notice of Allowance dated Jun. 14, 2012 in U.S. Appl. No. 12/416,675.
USPTO; Notice of Allowance dated Jul. 6, 2012 in U.S. Appl. No. 10/999,570.
USPTO; Final Office Action dated Aug. 27, 2012 in U.S. Appl. No. 12/874,063.
USPTO; Notice of Allowance dated Oct. 15, 2012 in U.S. Appl. No. 10/588,811.
USPTO; Final Office Action dated Oct. 17, 2012 in U.S. Appl. No. 11/303,018.
USPTO; Advisory Action dated Oct. 30, 2012 in U.S. Appl. No. 12/874,063.
PCT; Int'l Search Report and Written Opinion for Appl. No. PCT/US05/04135 dated Feb. 28, 2006.
PCT; International Preliminary Report on Patentability dated Sep. 25, 2006 in Application No. PCT/US2005/004135.
"Card Processing and management," Credit Management; Oct. 1998: p. 23.
Peter Lucas, "New cosbatants in the e-check wars: tired of watching the explosion in electronic check volume getting routed through the ACH, Visa and EFT networks," Credit Card Management, v. 15, n. 12, p. 24.
Nancy Paradis, "Mail order company returns money series: Action: Recalls, "St. Petersburg Times, Jun. 11, 2001, p. 2D.
Advisory Action dated Apr. 27, 2011 in U.S. Appl. No. 12/205,412.
USPTO; Office Action dated Nov. 22, 2013 in U.S. Appl. No. 12/874,063.
USPTO; Notice of Allowance dated Dec. 11, 2013 in U.S. Appl. No. 13/411,370.
USPTO; Notice of Allowance dated Jan. 7, 2014 in U.S. Appl. No. 13/411,299.
Video Technology News; "Common Interface Conditional Access System Wins Crucial Support in Europe"; Jun. 5, 1995, pp. 1-2.
Information Technology Newsweekly; "Convergys Information Management Group, Inc.; Patent Issued for System and method for a Flexible Device-based Rating Engine"; Jul. 23, 2013, pp. 1-4.
USPTO; Office Action dated Nov. 20, 2013 in U.S. Appl. No. 13/620,054.
USPTO; Advisory Action dated Aug. 6, 2013 in U.S. Appl. No. 13/411,370.

* cited by examiner

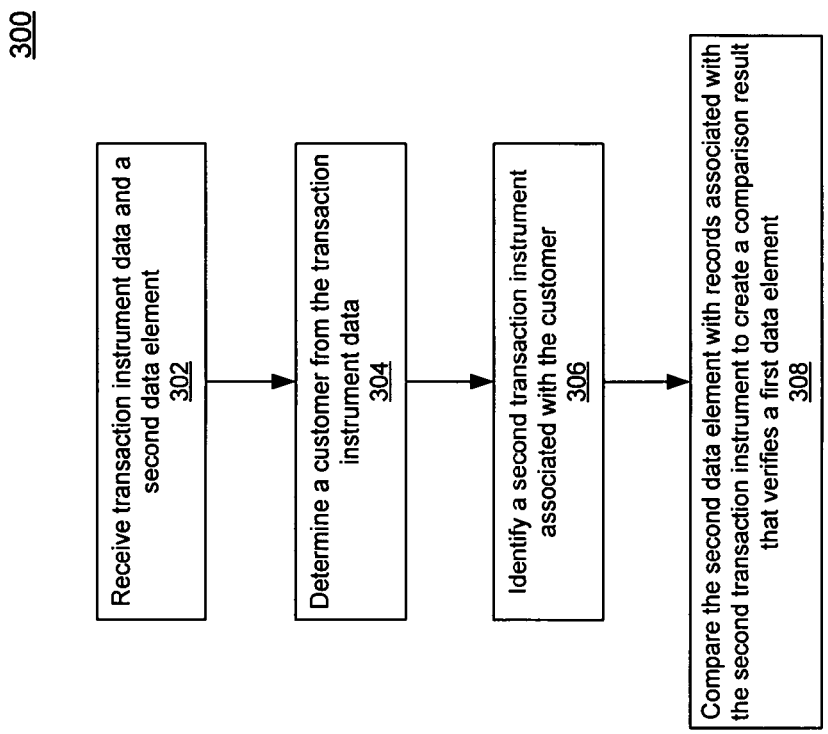

Card presented transaction

Card not presented transaction

METHOD, SYSTEM, AND COMPUTER PROGRAM PRODUCT FOR CUSTOMER-LEVEL DATA VERIFICATION

BACKGROUND OF THE INVENTION

1. Field of the Invention

The present invention generally relates to fraud detection and more particularly to reducing transaction errors.

2. Background Art

Many customers have multiple financial transaction instruments and transaction accounts with a financial institution. These customers often have different billing addresses, mailing addresses, names, telephone numbers, and/or e-mail addresses associated with their different financial transaction instruments and transaction accounts. Thus, when a customer provides a billing address, a mailing address, a name, a telephone number, or an e-mail address to a merchant, the customer may accidentally provide information that is valid, but not identical to that on record for a specific financial transaction instrument or transaction account. When the merchant provides this information to an address verification system, the address verification system responds that the information provided does not match, or only partially matches, that on record. This may result in an incorrect calculation of transaction risk, an incorrectly declined transaction, or an authorization error as well as a reduction in customer satisfaction. This problem has aggravated negative effects because it is likely to occur to devoted customers having multiple transaction accounts and/or financial transaction instruments.

FIG. 1A illustrates an example of the problem where a customer has a first transaction account 102 and a second transaction account 104 with identical names associated with the accounts, but different addresses. Both account records contain information including an account number 106A,B; a name 108A,B; an address 110A,B; and a postal code 112A,B.

The problem arises when a customer presents data 114 to a merchant. In the example of FIG. 1A, presented data 114 includes a financial transaction instrument or an account number 116 similar to that of the first transaction account 102, a presented address 118 similar to that of the second transaction account 104, a presented postal code 120 similar to that of the second transaction account 104, and a presented name 122 similar to that of both transaction accounts 102, 104. The merchant communicates presented data 114 to an address verification system. The address verification system compares presented data 114 to first transaction account 102 based on the similarity between presented account number 116 and first transaction account's account number 106A. The address verification system compares presented address 118 and presented postal code 120 to address 110A and postal code 112A of the first transaction account 102. The address verification system erroneously responds that presented address 118 and presented postal code 120 do not match that of the customer. This error may result in an incorrect calculation of transaction risk, an incorrectly declined transaction, or an authorization error.

FIG. 1B illustrates another example of the problem where a customer has two transaction accounts with identical addresses, a maiden name on a first transaction account 151, and a married name on a second transaction account 152. In this example, both accounts contain information including an account number 156A,B; a name 158A,B; an address 160A, B; and a postal code 162A,B.

The problem arises when a customer presents data 164 to a merchant. In the example of FIG. 1B, presented data 164 includes a financial transaction instrument or an account number 163 similar to that of first transaction account 151, a presented address 166, a presented postal code 168, and a presented name 170 similar to that of the second financial transaction account 152. The merchant communicates the presented data to an address verification system. The address verification system compares presented data 164 to first transaction account 151 based on the similarity of presented account number 163 and the first transaction account's 151 account number 156A. The address verification system compares the presented address 166 to first transaction account's 151 address 160A and responds there is a match. The address verification system also compares presented postal code 168 to first transaction account's 151 postal code 162A and correctly responds that there is a match. However, when the address verification system compares presented name 170 to the first transaction account's 151 name 158A, the address verification system erroneously responds that the name provided does not match that of the customer. Thus, the address verification system erroneously provides a partial match result. This may result in an incorrect calculation of transaction risk, an incorrectly declined transaction, or an authorization error.

Thus, given the foregoing, what is needed is a system, method, and computer program product for customer-level data verification that overcomes the shortcomings listed above.

BRIEF SUMMARY OF THE INVENTION

The customer-level data verification tool meets the above-identified needs by providing a system, method, and computer program product that verifies data elements across multiple records for an individual customer. An advantage of the customer-level data verification tool is that it improves accuracy of transaction risk calculations by reducing a probability of errors during a fraud detection process. This provides a reduction in the number of incorrectly declined transactions due to authorization errors as well as providing an increase in customer satisfaction. Another advantage of the customer-level data verification tool is that it provides a merchant system and/or merchant with comparison results at the data element level so the merchant system and/or merchant has comparison results available as input to a decision-making process.

The customer-level data verification tool first receives at least one data element as well as transaction account data and/or financial transaction instrument data. Then, a customer is determined from a first record associated with the transaction account data and/or financial transaction instrument data. The customer may be identified in the form of a customer number. A record search is performed to identify at least one additional record associated with the customer. The record search may be based on a search for a common customer number. Finally, the data element is compared to information contained in an additional record to create a comparison result that verifies a customer address. The comparison result may be used as an input to transaction risk calculations. The comparison result may also be provided to a merchant system and/or merchant for use in a decision-making process, for example, to verify customer identity.

Further embodiments, features, and advantages of the customer-level data verification tool, as well as the structure and operation of the various embodiments of the customer-level data verification tool, are described in detail below with reference to the accompanying drawings.

BRIEF DESCRIPTION OF THE DRAWINGS/FIGURES

The accompanying drawings, which are incorporated herein and form a part of the specification, illustrate the invention and, together with the description, further serve to explain the principles of the invention and to enable a person skilled in the pertinent art to make and use the invention:

FIG. 3 is a flowchart of an exemplary process for customer-level data verification;

The invention will be described with reference to the accompanying drawings. The drawing in which an element first appears is typically indicated by the leftmost digit(s) in the corresponding reference number.

DETAILED DESCRIPTION OF THE INVENTION

I. Overview

Figure 1A:
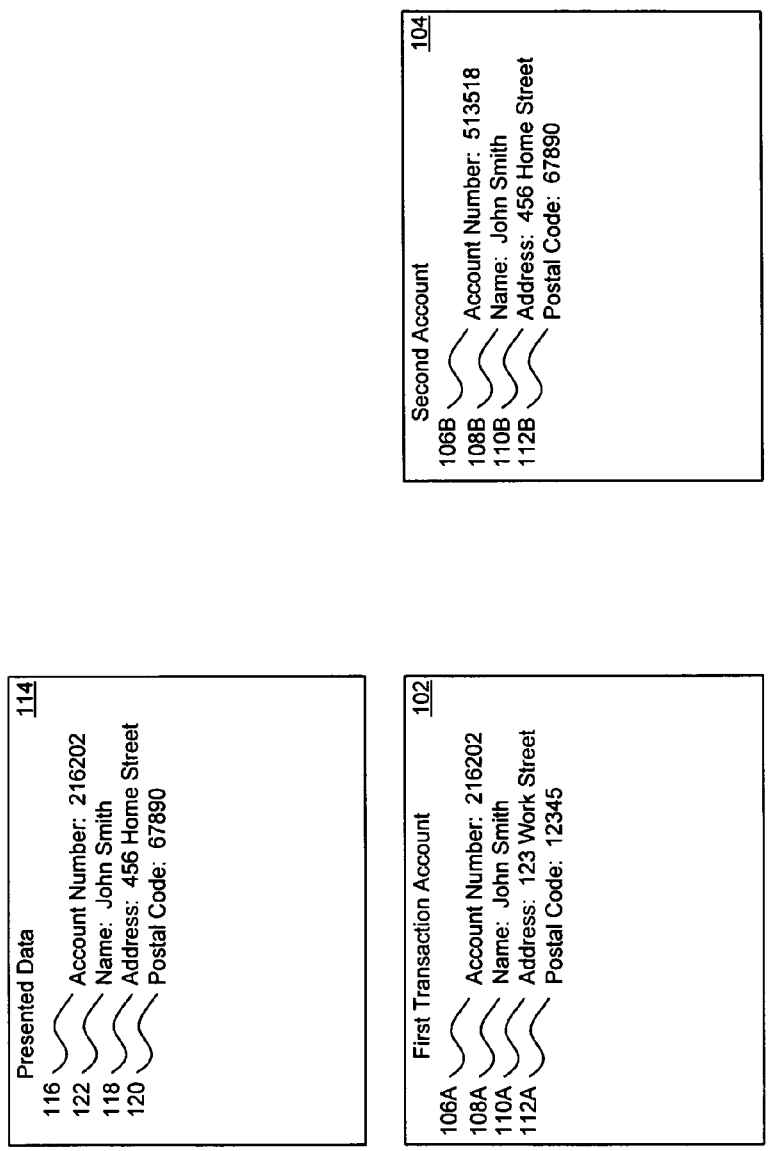
FIG. 1A illustrates an example of the problem that occurs when one customer has two accounts with an identical name and different addresses.
Figure 1B:
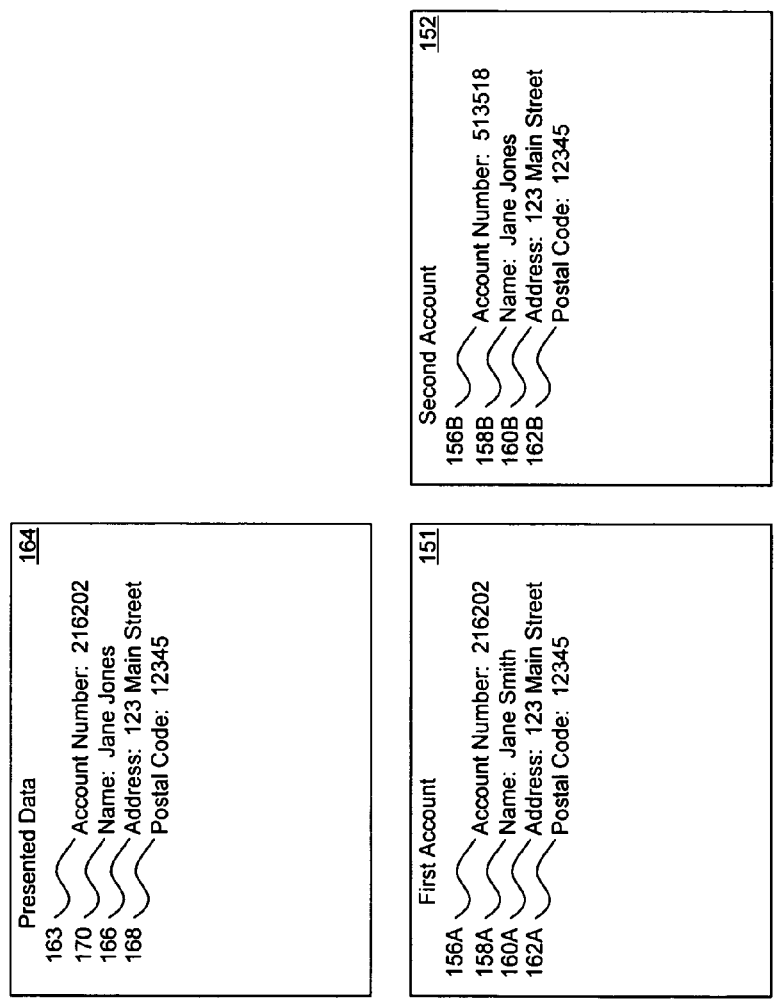
FIG. 1B illustrates an example of the problem that occurs when one customer has two accounts with an identical address and different names.

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications. It will also be apparent to a person skilled in the pertinent art that this invention may be implemented in a variety of geographic regions including, and not limited to, national, continental, international, and world-wide regions.

The terms "user," "end user," "consumer," "customer," "participant," and/or the plural form of these terms are used interchangeably throughout herein to refer to those persons or entities capable of accessing, using, being affected by and/or benefiting from the tool that the present invention provides for customer-level data verification. Furthermore, the terms "business" or "merchant" may be used interchangeably with each other and shall mean any person, entity, distributor system, software and/or hardware that is a provider, broker, and/or any other entity in the distribution chain of goods or services. For example, a merchant may be a grocery store, a retail store, a travel agency, a service provider, an on-line merchant, or the like.

1. Transaction Accounts and Instrument

A "transaction account" as used herein refers to an account associated with an open account/card system or a closed account/card system (as described below). The transaction account may exist in a physical or non-physical embodiment. For example, a transaction account may be distributed in non-physical embodiments such as an account number, frequent-flyer account, telephone calling account or the like. Furthermore, a physical embodiment of a transaction account may be distributed as a financial transaction instrument. A customer may have multiple transaction accounts.

A financial transaction instrument may be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A financial transaction instrument may also have electronic functionality provided by a network of electronic circuitry that is printed or otherwise incorporated onto or within the transaction instrument (and typically referred to as a "smart card"), or be a fob having a transponder and an RFID reader. A customer may have multiple financial transaction instruments.

2. Open Versus Closed Cards

"Open cards" are financial transaction cards that are generally accepted at different merchants. Examples of open cards include the American Express®, Visa®, MasterCard® and Discover® cards, which may be used at many different retailers and other businesses. In contrast, "closed cards" are financial transaction cards that may be restricted to use in a particular store, a particular chain of stores or a collection of affiliated stores. One example of a closed card is a pre-paid gift card that may only be purchased at, and only be accepted at, a clothing retailer, such as The Gap® store.

3. Stored Value Cards

Stored value cards are forms of transaction instruments associated with transaction accounts, wherein the stored value cards provide cash equivalent value that may be used within an existing payment/transaction infrastructure. Stored value cards are frequently referred to as gift, pre-paid or cash cards, in that money is deposited in the account associated with the card before use of the card is allowed. For example, if a customer deposits ten dollars of value into the account associated with the stored value card, the card may only be used for payments together totaling no more than ten dollars.

4. Use of Transaction Accounts

With regard to use of a transaction account, users may communicate with merchants in person (e.g., at the box office), telephonically, or electronically (e.g., from a user computer via the Internet). During the interaction, the merchant may offer goods and/or services to the user. The merchant may also offer the user the option of paying for the goods and/or services using any number of available transaction accounts. Furthermore, the transaction accounts may be used by the merchant as a form of identification of the user. The merchant may have a computing unit, for example, a merchant system 204, implemented in the form of a computer-server, although other implementations are possible.

In general, transaction accounts may be used for transactions between the user and merchant through any suitable communication means, such as, for example, a telephone network, intranet, the global, public Internet, a point of interaction device (e.g., a point of sale (POS) device, personal digital assistant (PDA), mobile telephone, kiosk, etc.), online communications, off-line communications, wireless communications, and/or the like.

5. Account and Merchant Numbers

An "account," "account number," or "account code," as used herein, may include any device, code, number, letter, symbol, digital certificate, smart chip, digital signal, analog signal, biometric or other identifier/indicia suitably configured to allow a consumer to access, interact with or communicate with a financial transaction system. The account number may optionally be located on or associated with any financial transaction instrument (e.g., rewards, charge, credit, debit, prepaid, telephone, embossed, smart, magnetic stripe, bar code, transponder or radio frequency card).

The account number may be distributed and stored in any form of plastic, electronic, magnetic, radio frequency (RF), radio frequency identification (RFID), wireless, audio and/or optical device capable of transmitting or downloading data from itself to a second device. A customer account number may be, for example, a sixteen-digit credit card number. Each credit card issuer has its own numbering system, such as the fifteen-digit numbering system used by American Express Company of New York, N.Y. Each issuer's credit card numbers comply with that company's standardized format such that an issuer using a sixteen-digit format will generally use four spaced sets of numbers in the form of:

$$N_1N_2N_3N_4\ N_5N_6N_7N_8\ N_9N_{10}N_{11}N_{12}\ N_{13}N_{14}N_{15}N_{16}$$

The first five to seven digits are reserved for processing purposes and identify the issuing institution, card type, etc. In this example, the last (sixteenth) digit is typically used as a sum check for the sixteen-digit number. The intermediary eight-to-ten digits are used to uniquely identify the customer, card holder or cardmember.

A merchant account number may be, for example, any number and/or alpha-numeric characters that identifies a particular merchant for purposes of card acceptance, account reconciliation, reporting and the like.

6. RFID and Transmission of Magnetic Stripe Data

It should be noted that the transfer of information in accordance with the present invention, may be done in a format recognizable by a merchant system or account issuer. In that regard, by way of example, the information may be transmitted from an RFID device to an RFID reader, or from the RFID reader to the merchant system in magnetic stripe or multi-track magnetic stripe format.

Because of the proliferation of devices using magnetic stripe format, the standards for coding information in magnetic stripe format were standardized by the International Organization for Standardization in ISO/IEC 7811-n (characteristics for identification cards) which are incorporated herein by reference. The ISO/IEC 7811 standards specify the conditions for conformance, physical characteristics for the card (warpage and surface distortions) and the magnetic stripe area (location, height and surface profile, roughness, adhesion, wear and resistance to chemicals), the signal amplitude performance characteristics of the magnetic stripe, the encoding specification including technique (MFM), angle of recording, bit density, flux transition spacing variation and signal amplitude, the data structure including track format, use of error correction techniques, user data capacity for ID-1, ID-2 and ID-3 size cards, and decoding techniques, and the location of encoded tracks.

Typically, magnetic stripe information is formatted in three tracks. Certain industry information must be maintained on certain portions of the tracks, while other portions of the tracks may have open data fields. The contents of each track and the formatting of the information provided to each track is controlled by the ISO/IEC 7811 standard. For example, the information must typically be encoded in binary. Track 1 is usually encoded with user information (i.e., name) in alpha-numeric format. Track 2 is typically comprised of discretionary and nondiscretionary data fields. In one example, the nondiscretionary field may comprise 19 characters and the discretionary field may comprise 13 characters. Track 3 is typically reserved for financial transactions and includes enciphered versions of the user's personal identification number, country code, current units amount authorized per cycle, subsidiary accounts, and restrictions.

As such, where information is provided in accordance with the present invention, it may be provided in magnetic stripe track format. For example, the counter values, authentication tags and encrypted identifiers, described herein, may be forwarded encoded in all or a portion of a data stream representing data encoded in, for example, track 2 or track 3 format.

Persons skilled in the relevant arts will understand the breadth of the terms used herein and that the exemplary descriptions provided are not intended to be limiting of the generally understood meanings attributed to the foregoing terms.

It is noted that references in the specification to "one embodiment," "an embodiment," "an example embodiment," etc., indicate that the embodiment described may include a particular feature, structure, and/or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to effect such feature, structure, or characteristic in connection with other embodiments whether or not explicitly described.

II. System

Figure 2:
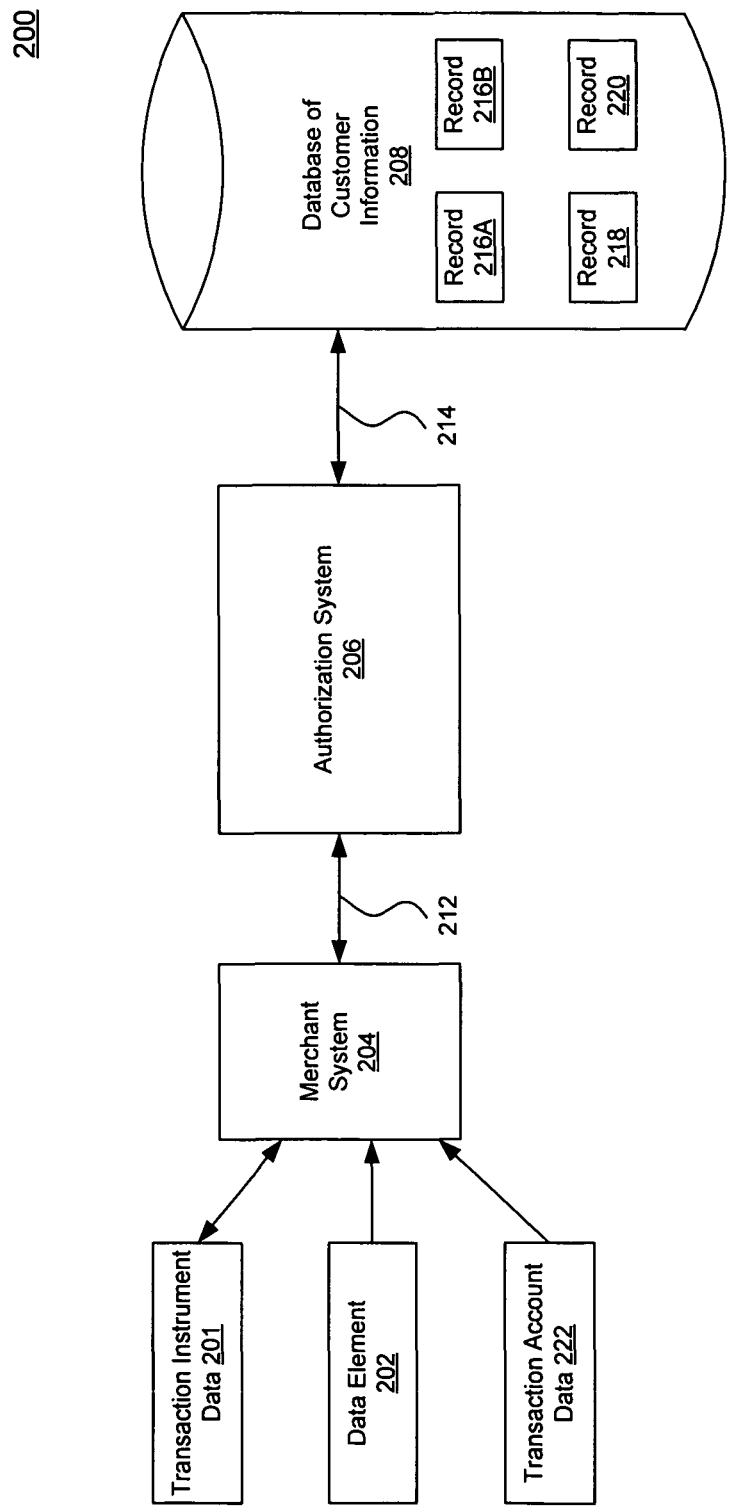
FIG. 2 is a block diagram of an exemplary system for customer-level data verification.

FIG. 2 is a block diagram of an exemplary system 200 for data element verification. The system includes merchant system 204 which, among other functions, gathers customer information. Customer information includes, for example, and not limited to, transaction instrument data 201, transaction account data 222, and/or a data element 202.

Transaction instrument data 201 is data that identifies a financial transaction instrument. Transaction instrument data 201 includes information that is stored in, on, or by any financial transaction instrument. Examples of transaction instrument data 201 include, and are not limited to, radio frequency identification (RFID) data, magnetic stripe data, an account number, account data, account name, a credit card verification number, and an expiration date.

Data element 202 is information known by both a financial transaction instrument issuer and the customer having a financial transaction instrument issued by the financial transaction instrument issuer. Data element 202 is used for identity verification and/or as a fraud prevention tool. Examples of data element 202 include, and are not limited to, a name, a phone number, an address, a postal code, an e-mail address, an IP address, a complete social security number, a partial social security number, an account number, a customer code, a personal identification number, and a customer-specific alphanumeric identifier. Data element 202 is often provided to a merchant during the normal course of a transaction, thus collection of data elements for data verification imposes little, if any, burden on the customer. Although systems and methods will be described herein with reference to address verification, one of skill in the related art(s) will recognize that other data verifications can be made without departing from the spirit and scope of the present invention.

Merchant system 204 is a system for, among other functions, collecting transaction instrument data 201 and/or data element 202 for transaction processing. In an embodiment, a merchant system includes, and is not limited to, a telephone network, an intranet, a global public Internet, a point of interaction device (e.g., a point of sale (POS) device, a personal digital assistant (PDA), a mobile telephone, a kiosk, etc.), an online communications device, an off-line communications device, a wireless communications device, and/or the like. Transaction processing includes, and is not limited to, identity verification, data verification, and authorization of use of a financial transaction instrument.

Merchant system 204 is coupled via a communication link 212 to an authorization system 206. Examples of communication link 212 include, and are not limited to, a telephone network, a cable, a radio frequency transmission system, a cellular telephone, and/or a computer network.

Authorization system 206 is a system that provides, among other functions, an authorization decision based on risk analysis in response to an authorization request. In an embodiment, authorization system 206 provides a data verification reply in response to a data verification request. In an embodiment, authorization system 206 includes merchant system 204. In another embodiment, merchant system 204 includes authorization system 206.

Authorization system 206 is coupled via a communication link 214 to a database of customer information 208. Examples of communication link 214 include, and are not limited to, a telephone network, a cable, a radio frequency transmission system, a cellular telephone, and/or a computer network.

Database of customer information 208 stores customer records 216A,B; 218; and 220. Information contained in the records may be in any format and may contain alphanumeric characters. Database of customer information 208 may be part of authorization system 206. In an embodiment, customer records 216A, 216B, 218, and 220 are stored on the basis of individual financial transaction instruments. One record is kept for each individual financial transaction instrument. For example, a customer having a first financial transaction instrument and a second financial transaction instrument would have two records in database of customer information 208. In an example, first record 216A is associated with the first financial transaction instrument and second record 216B is associated with the second financial transaction instrument. Multiple records may be kept for each individual financial transaction instrument.

In another embodiment, customer records 216A, 216B, 218, and 220 are stored on the basis of customers. One record is stored per customer with all of the customer's financial transaction instruments recorded on the same record. For example, a first customer having a first plurality of financial transaction instruments is associated with first record 218 while a second customer having a second plurality of financial transaction instruments is associated with second record 220.

III. Process

FIG. 3 is a flowchart of an exemplary process 300 for data element verification. In step 302, transaction instrument data and a data element is received. The transaction instrument data and a data element may be received by a system or computer product that performs data verification. In an example, in step 302, transaction instrument data 201 and/or data element 202 are received by authorization system 206 from merchant system 204 via communication link 212. In another embodiment, in step 302, transaction instrument data 201 and/or data element 202 are received by merchant system 204. In another example, transaction instrument data 201 and/or data element 202 are received at least in part from one of a point-of-sale device, a sales platform, a computer, or a website. In an embodiment, the exemplary process of FIG. 3 is performed by the system illustrated in FIG. 7.

In one example of step 302, data element 202 is, or represents, at least one of a name, a phone number, an address, a postal code, an e-mail address, an IP address, a complete social security number, a partial social security number, an account number, a customer code, a personal identification number, and/or a customer-specific alphanumeric identifier. In an example, data element 202 may include a billing address or a shipping address.

In another embodiment, step 302 is commenced in response to reception of a stand-alone verification request. A stand-alone verification request may be a request made by merchant system 204 that does not simultaneously contain an authorization request. A stand-alone verification request may be made by merchant system 204 to verify an address and/or data element 202 provided by a customer. For example, a stand-alone verification request may be made to verify a shipping address, a mailing address, a billing address, a customer address, and/or data element 202.

In step 304, a customer is determined from transaction instrument data 201. In an example, step 304 is performed by authorization system 206. The customer may be identified by authorization system 206 through a search for at least one customer record in database of customer information 208. In step 304, the transaction instrument data may include an account number and/or a customer number. In an embodiment, step 304 is performed by merchant system 204.

In step 306, a second transaction instrument associated with the customer is identified. In an example, step 306 is performed by authorization system 206. The customer may be identified by a customer number that is common to transaction instrument data 201, a second transaction instrument, and/or at least one record associated with a second transaction instrument. In another example, the customer is identified by information that is common to transaction instrument data 201, a second transaction instrument, and/or at least one record associated with a second transaction instrument and/or transaction account. In an example, the second transaction instrument associated with the customer is identified by authorization system 206 by searching at least one customer record 216A, 216B, 218, and 220 in database of customer information 208. In an embodiment, step 306 is performed by merchant system 204 and/or a merchant.

In step 308, data element 202 is compared with at least one record 216A, 216B, 218, and 220 associated with the second transaction instrument to create a comparison result that verifies an address. In an example, step 308 is performed on data element 202 and at least one customer record 216A, 216B, 218, and 220 contained in database of customer information 208 by authorization system 206. In an embodiment, step 308 is performed by merchant system 204 and/or a merchant. In one example of step 308, customer record 216A, 216B, 218, and 220 associated with the second transaction instrument contains data representing at least one of a name, a phone number, an address, a postal code, an e-mail address, an IP address, a complete social security number, a partial social security number, an account number, a customer code, a personal identification number, and/or a customer-specific alphanumeric identifier.

The comparison result of step 308 may then be provided to merchant system 204 and/or a merchant. The comparison result may, for example, be an identifier such as match, partial match, or no match. The comparison result may also identify customer record 216A, 216B, 218, and 220 upon which the comparison result is based. The comparison result may also identify whether the comparison result is, or is not, based on customer record 216A, 216B, 218, and 220 associated with transaction instrument data 201 received in step 302. In an example, the comparison result identifies data element 202 that does and/or does not match customer records 216A, 216B, 218, and 220 in database of customer information 208. In another example, the comparison result provides an alphanumeric response indicating a level of correlation between data element 202 and customer records 216A, 216B, 218, and 220.

Transaction risk may be calculated based in part on the comparison result. For example, the transaction risk calculation may be performed based in part on the comparison result by a data verification system, authorization system 206, merchant system 204, and/or a merchant.

An authorization result may be decided based in part on the comparison result. For example, the authorization result may be determined by a verification system, authorization system 206, merchant system 204, and/or a merchant. In an example, an authorization result is provided to a merchant by authorization system 206 and/or merchant system 204. In another example, an authorization result is provided to merchant system 204 by authorization system 206 and/or a merchant. In an example, the provision of authorization results and/or comparison results is communicated via communication link 212.

Figure 4A:
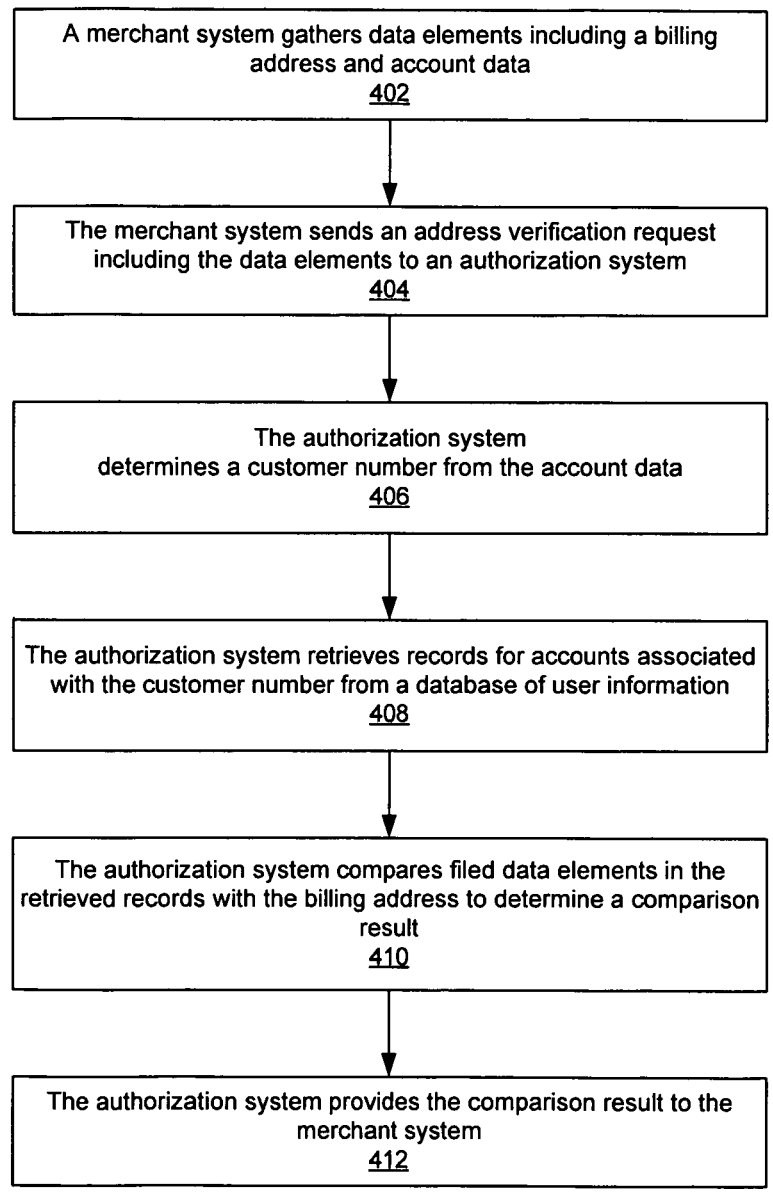
FIG. 4A is another flowchart of an exemplary process for customer-level address verification.
Figure 4B:
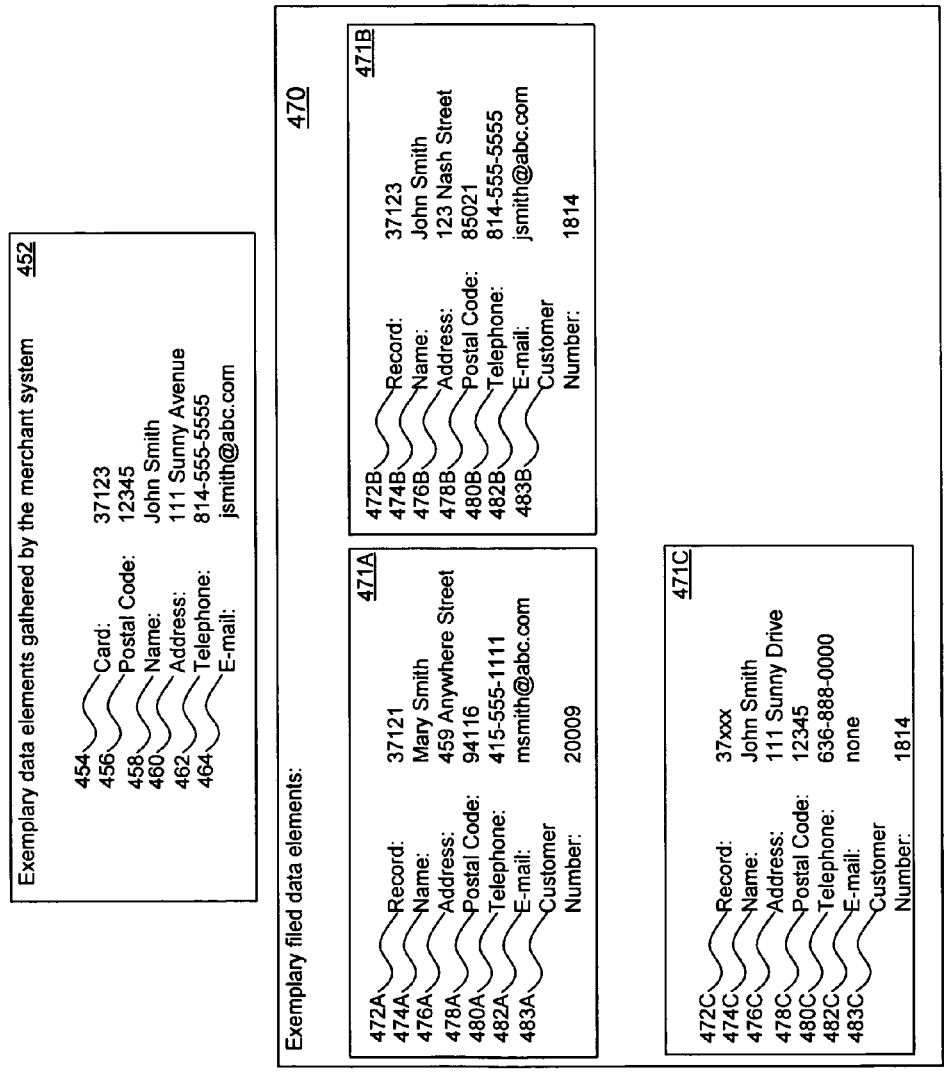
FIG. 4B is a block diagram of an exemplary process for customer-level address verification showing received data elements and filed data elements.

FIG. 4A is a flowchart of an exemplary process 400 for customer-level address verification. FIG. 4B shows example received data elements 452 and example filed data elements and/or records 470 used in process 400. In an embodiment, process 400 is performed by the system illustrated in FIG. 2 and/or FIG. 7.

In step 402, a merchant system gathers data elements including a billing address and account data. In an example, received data elements 452 that are gathered by the merchant system include a postal code 456, a name 458, an address 460, a telephone number 462, and/or an e-mail address 464. The account data includes a financial transaction instrument number 454.

In step 404, the merchant system sends an address verification request including the data elements to an authorization system. In an example, the authorization system receives received data elements 452 with financial transaction instrument number 454 from the merchant system.

In step 406, the authorization system determines a customer number from the account data. In an example, the authorization system searches filed data elements and/or records 470. Filed data elements and/or records 470 may be part of customer records 471A, 471B, and 471C in a database of customer information. Record 471A is an exemplary customer record and includes a record number 472A, a name 474A, an address 476A, a postal code 478A, a telephone number 480A, an e-mail address 482A, and a customer number 483A. Example records 471B and 471C include similar types of information. Information contained in a filed data element and/or record 470 may be in any format and may contain alphanumeric characters. In an example, the record number is a transaction account number. In another example, the record number is financial transaction instrument number 454. The address may be a physical location at which a customer receives correspondence. The authorization system retrieves the customer's first record 471B that is associated with financial transaction instrument number 454 in received data elements 452. The authorization system then retrieves customer number 483B that is part of the customer's first record 471B.

In step 408, the authorization system searches for, and retrieves, account records associated with the customer number. In an example, the authorization system compares the retrieved customer number 483B with other customer numbers in the filed data elements and/or records 470. In the example shown in FIG. 4B, customer record 471C contains customer number 483C identical to customer number 483B of the customer's first record 471B. Record 471C may be associated with a different financial transaction instrument than record 471B.

In step 410, the authorization system compares filed data elements in the retrieved records with the billing address to determine a comparison result. In an example, at least one of the filed data elements of the customer's second record 471C is compared to received data elements 452. For example, the filed data element of postal code 478C is compared to the received data element of postal code 456. The comparison yields a comparison result. In an example, the comparison result is match, partial match, or no match.

In step 412, the authorization system communicates the comparison result to the merchant system. In an example, the comparison result of match, partial match, or no match is provided to the merchant system and/or the merchant for each comparison of gathered data elements as well as the over-all comparison result for all received data elements. For example, results provided to a merchant system are a comparison result for postal code of match, a comparison result for addresses of a partial match, a comparison result for name of match, a comparison result for e-mail of match, and an over-all comparison result of partial match. The authorization request results may be provided to a merchant point of sale device, website, and/or merchant sales system. The merchant system and/or merchant may use the comparison results as input to a decision-making process.

Figure 5A:
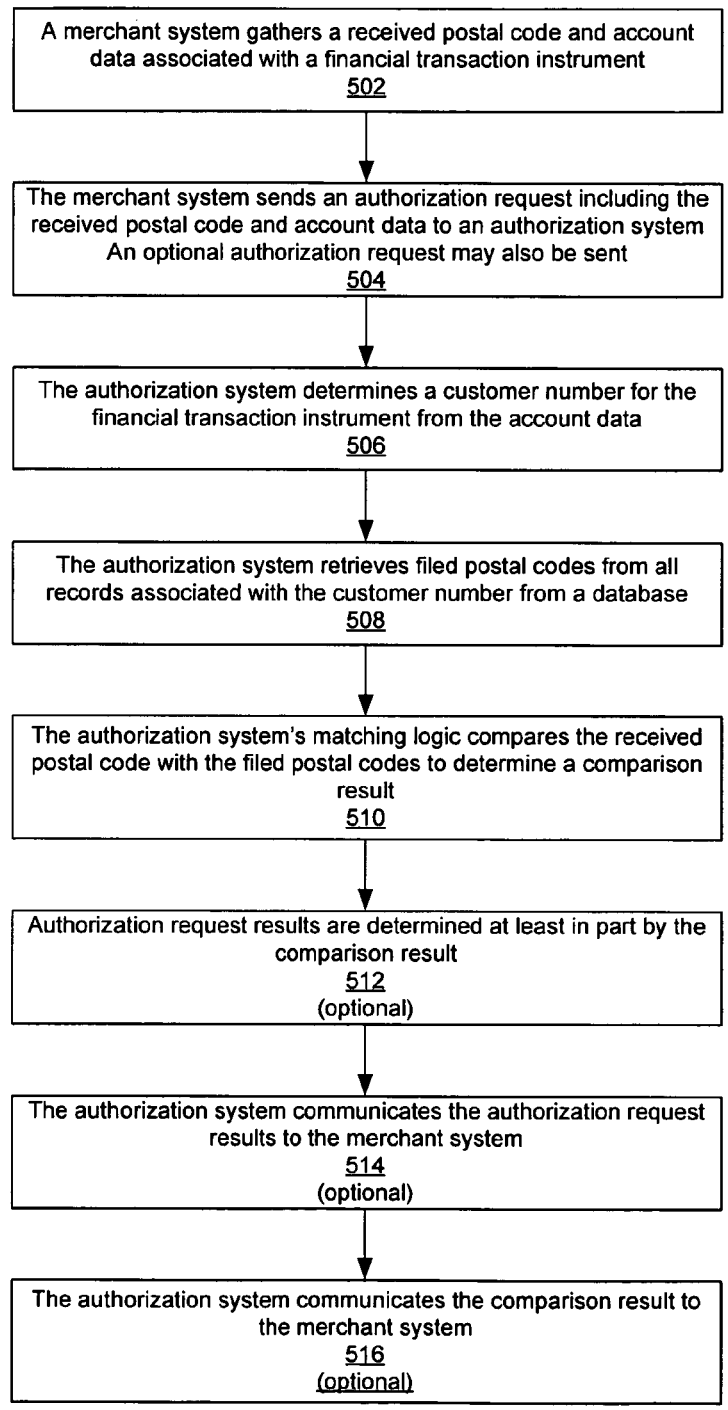
FIG. 5A is a flowchart of an exemplary process for customer-level address verification where a financial transaction instrument is presented.
Figure 5B:
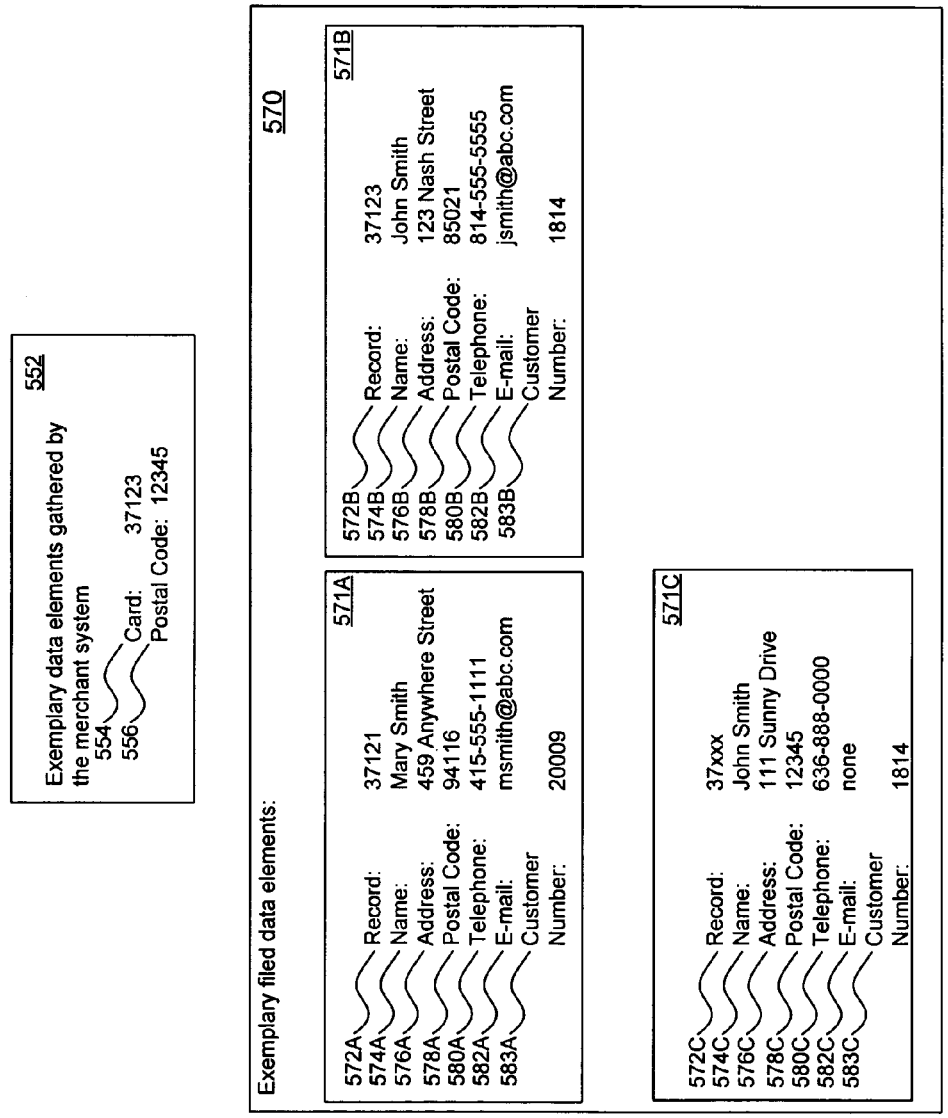
FIG. 5B is a block diagram of an exemplary process for customer-level address verification showing received data elements and filed data elements where a financial transaction instrument is presented.

FIG. 5A is a flowchart of an exemplary process 500 for customer-level address verification where a financial transaction card is presented by a customer to a merchant. FIG. 5B shows example received data elements 552 and example filed data elements 570 used in process 500. In an embodiment, process 500 is performed by the system shown in FIG. 2 and/or FIG. 7.

In step 502, a merchant system gathers a received postal code and account data associated with a financial transaction instrument. In an example, received data elements 552 that are gathered by the merchant system include a postal code 556. The account data includes financial transaction instrument number 554.

In step 504, the merchant system sends a data verification request including the received postal code and account data, to an authorization system. An optional authorization request may also be sent. In an example, the authorization system receives data elements 552.

In step 506, the authorization system determines a customer number for the financial transaction instrument from the account data. In an example, the authorization system searches filed data elements and/or records 570. In an example, filed data elements and/or records 570 are part of customer records 571A, 571B, and 571C. Record 571A is an exemplary customer record, and includes a record number 572A, a name 574A, an address 576A, a postal code 578A, a telephone number 580A, an e-mail address 582A, and a customer number 583A. Example records 571B and 571C include similar types of information. In an example, the record number is a transaction account number. In another example, the record number is financial transaction instrument number 554. The authorization system retrieves the customer's first record 571B that is associated with financial transaction instrument number 554 in received data elements 552. The authorization system then retrieves customer number 583B that is part of customer's first record 571B.

In step 508, the authorization system retrieves, from a database, filed postal codes from all records associated with the customer number. The authorization system may compare retrieved customer number 583B with other customer numbers in filed data elements and/or records 570. In the example shown in FIG. 5B, second record 571C contains customer number 583C that is identical to customer number 583B of the customer's first record 571B. The second record may be associated with a different financial transaction instrument than the first record. Filed postal code 578C of the customer's second record 571C is retrieved for comparison with received data elements 552.

In step 510, the authorization system's matching logic compares the received postal code with the filed postal codes to determine a comparison result. In an example, filed postal code 578C of the customer's second record 571C is compared to received postal code 556. The comparison yields a comparison result. In an example, the comparison result is match, partial match, or no match.

In step 512, authorization request results are determined at least in part by the comparison result. This step is optional. In an example, the authorization request results in performance of risk analysis. An authorization request may yield an outcome of approved, pended, referred, or declined. The authorization result may be determined by a merchant, merchant system, or authorization system.

In step 514, the authorization system communicates the authorization request results to the merchant system. This step is optional. In an example, the authorization result of approved, pended, referred, or declined is provided to the merchant system and/or the merchant. The authorization request results may be provided to a merchant point of sale device, website, and/or merchant sales system.

In step 516, the authorization system communicates the comparison result to the merchant system. This step is optional. The comparison result may be for comparison of a single data element or for comparison of multiple data elements. In an example, the comparison result of match, partial match, and/or no match is provided to the merchant system and/or the merchant for each comparison of gathered data elements as well as the overall comparison result for all gathered data elements. For example, results provided to a merchant system are a comparison result for postal codes of match, a comparison result for address of a partial match, a comparison result for name of match, a comparison result for e-mail of match, and an over-all comparison result of partial match. The comparison results may be provided to a merchant point of sale device, website, and/or merchant sales system. The merchant system and/or merchant may use the comparison results as input to a decision-making process.

Figure 6A:
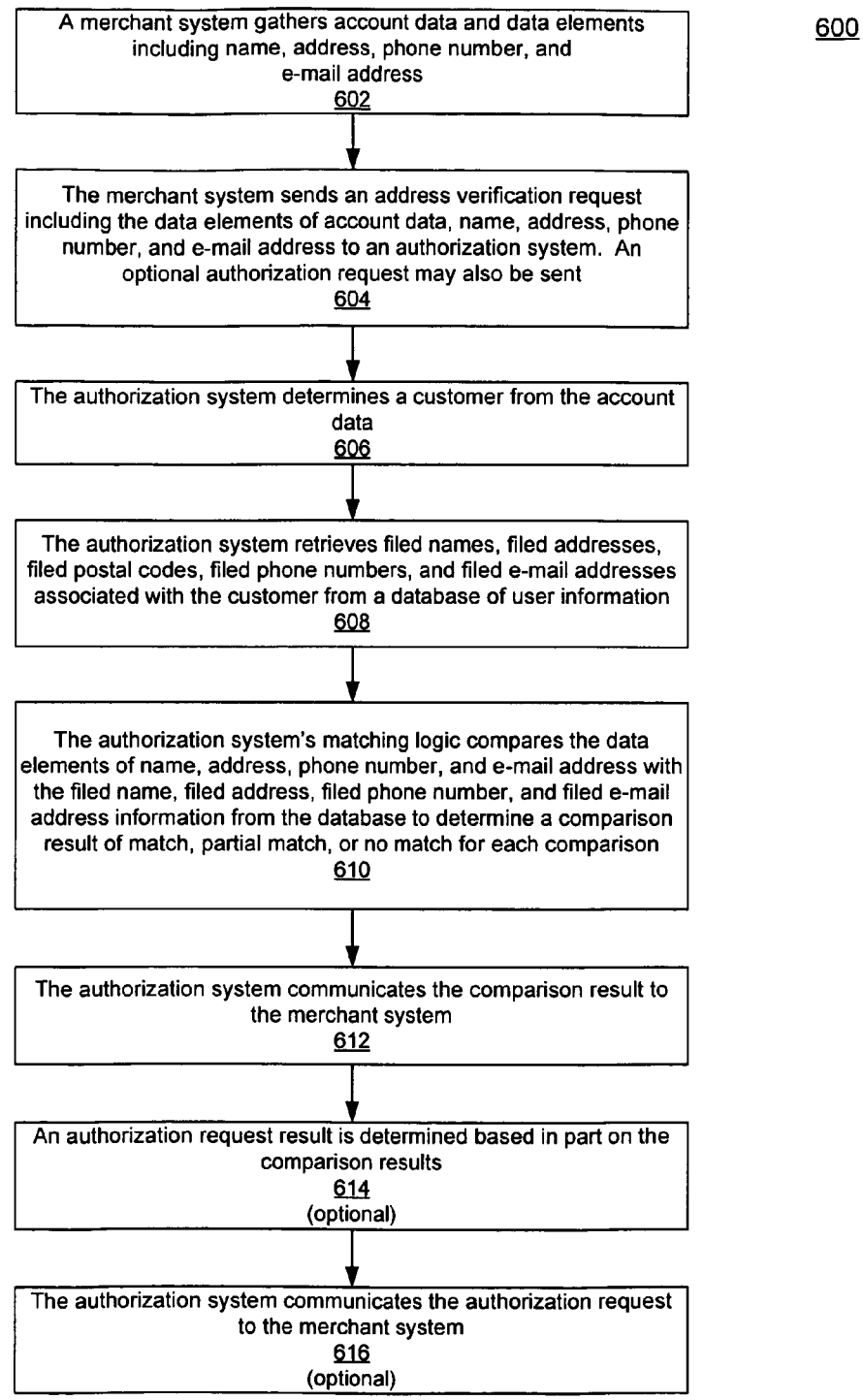
FIG. 6A is a flowchart of an exemplary process for customer-level address verification where a financial transaction instrument is not presented by a customer to a merchant.
Figure 6B:
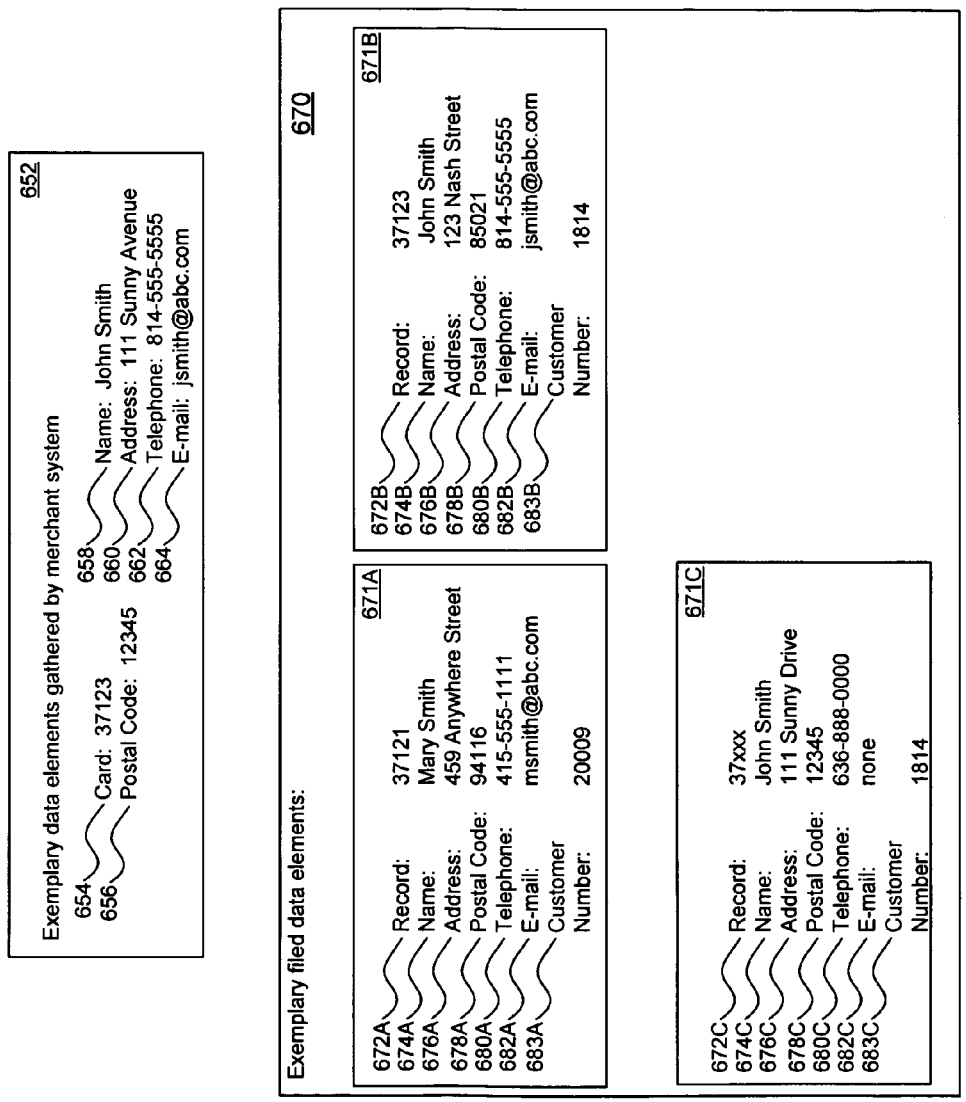
FIG. 6B is a block diagram of an exemplary process for customer-level address verification showing received data elements and filed data elements where a financial transaction instrument is not presented.

FIG. 6A is a flowchart of an exemplary process 600 for customer-level address verification where a financial transaction instrument is not presented by a customer to a merchant, but instead, an account number or information from a financial transaction instrument is provided. This type of transaction takes place when a customer telephonically or electronically communicates with a merchant, for example, by purchasing a product via the internet and/or over a telephone. FIG. 6B shows example received data elements 652 and example filed data elements 670 used in process 600. In an embodiment, process 600 is performed by the system shown in FIG. 2 and/or FIG. 7.

In step 602, a merchant system gathers account data and data elements including name, address, phone number, and/or e-mail address. In an example, received data elements 652 that are gathered include a postal code 656, a name 658, an address 660, a telephone number 662, and/or an e-mail address 664. The account data includes a financial transaction instrument number 654.

In step 604, the merchant system sends, to an authorization system, an address verification request including the data elements of account data, name, address, phone number, and/or e-mail address. An optional authorization request may also be sent. In an example, the authorization system receives received data elements 652.

In step 606, the authorization system determines a customer from the account data. In an example, the authorization system searches filed data elements and/or records 670. Filed data elements and/or records 670 may be part of customer records 671A, B, and C. Record 671A is an exemplary customer record, and includes a record number 672A, a name 674A, an address 676A, a postal code 678A, a telephone number 680A, an e-mail address 682A, and a customer number 683A. Example records 671B and 671C include similar types of information. Record number 672A may be a transaction account number and/or a financial transaction instrument number. The authorization system retrieves first record 671B that is associated with financial transaction instrument number 654 in received data elements 652. The authorization system then retrieves customer number 683B that is part of first record 671B.

In step 608, the authorization system retrieves filed names, filed addresses, filed postal codes, filed phone numbers, and/or filed e-mail addresses associated with the customer from a database of customer information. In an example, the authorization system compares retrieved customer number 683B with other customer numbers in filed data elements and/or records 670. In the example shown in FIG. 6B, there is a second record 671C that contains the customer number 683C identical to customer number 683B of first record 671B. The second record may be associated with a different financial transaction instrument or a different transaction account than the first record. Filed name 674C, address 676C, postal code 678C, phone number 680C, and/or e-mail address 682C of second record 671C may be retrieved for comparison.

In step 610, the authorization system's matching logic compares the data elements of name, address, phone number, and e-mail address with filed name, filed address, filed phone number, and/or filed e-mail address information from the database of customer information to determine a comparison result. In an example, filed data elements of second record 671C are compared to received data elements 652. For example, filed data element of postal code 678C is compared to the received data element of postal code 656. The comparison yields a comparison result for each individual comparison as well as an over-all comparison result for the collection of comparisons. In an example, the comparison result is match, partial match, or no match.

In step 612, the authorization system communicates the comparison result to the merchant system. In an example, the comparison result of match, partial match, and/or no match is provided to the merchant system and/or the merchant for each comparison of gathered data elements as well as the over-all comparison result for all gathered data elements. For example, results provided to a merchant system are a comparison result for postal codes of match, a comparison result for address of a partial match, a comparison result for name of match, a comparison result for e-mail of match, and an overall comparison result of partial match. The authorization request results may be provided to a merchant point of sale device, website, and/or merchant sales system. The merchant system and/or merchant may use the comparison results as input to a decision-making process.

In step 614, an authorization result is determined based in part on the comparison results. This step is optional. In an example, the authorization request results in performance of risk analysis. An authorization request may yield an outcome of approved, pended, referred, or declined. The authorization result may be determined by a merchant, merchant system, and/or authorization system.

In step 616, the authorization system communicates the authorization results to the merchant system. This step is optional. In an example, the authorization result of approved, pended, referred, or declined is provided to the merchant system and/or the merchant. The authorization request results may be provided to a merchant point of sale device, website, and/or merchant sales system.

IV. Example Implementations

The methods and/or processes herein (i.e., the system and/or process listed above or any part(s) or function(s) thereof) may be implemented using hardware, software or a combination thereof and may be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers and/or similar devices.

Figure 7:
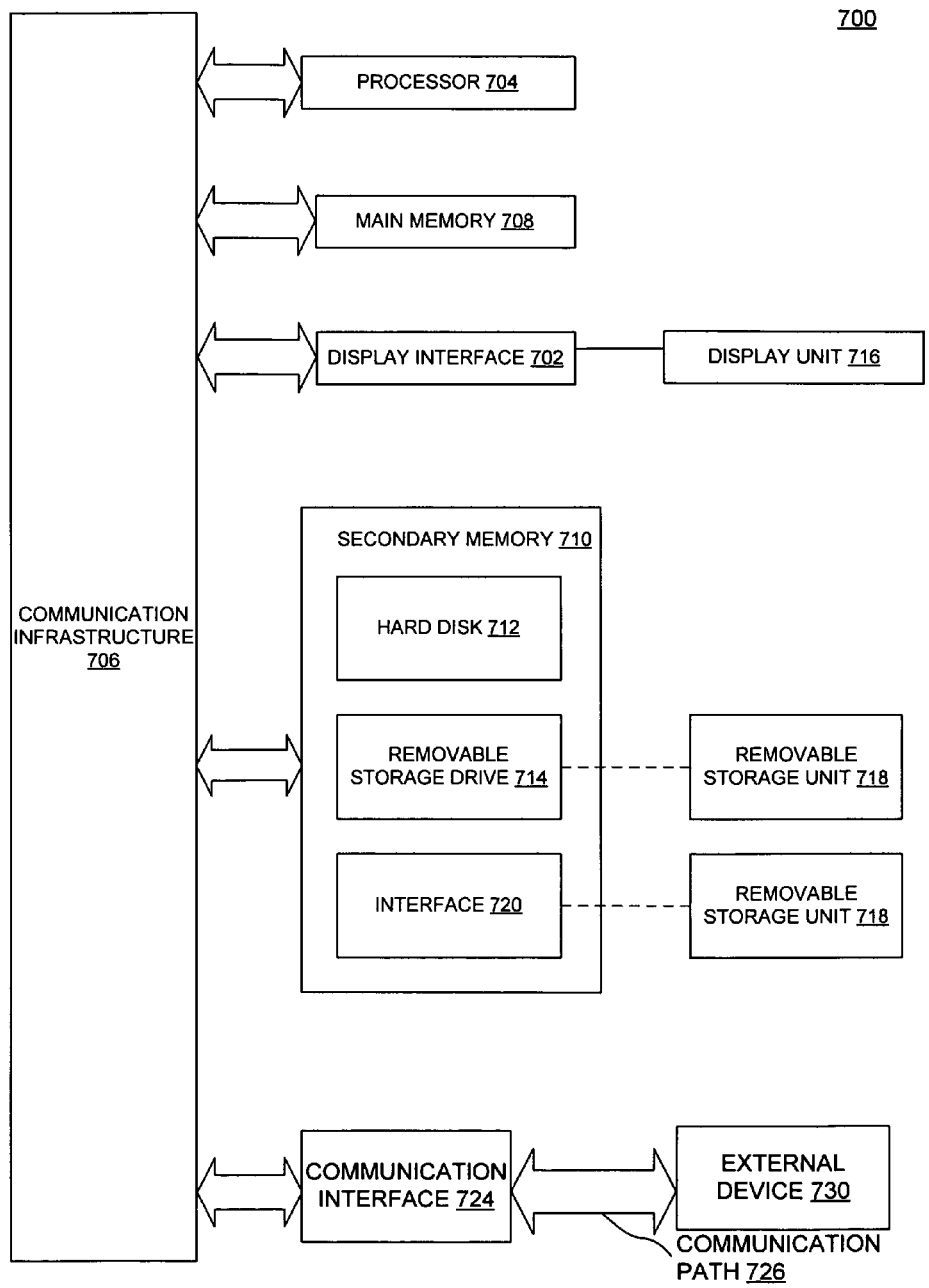
FIG. 7 is a block diagram of an exemplary computer system useful for implementing the present invention.

In one embodiment, the invention is directed toward one or more computer systems capable of carrying out the functionality described herein. An example of a computer system 700 is shown in FIG. 7.

Computer system 700 includes one or more processors 704. Processor 704 is connected to a communication infrastructure 706 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 700 can include a display interface 702 that forwards graphics, text, and other data from communication infrastructure 706 (or from a frame buffer not shown) for display on display unit 716.

Computer system 700 also includes a main memory 708, preferably random access memory (RAM), and may also include a secondary memory 710. Secondary memory 710 may include, for example, a hard disk drive 712 and/or a removable storage drive 714, representing a floppy disk drive, a magnetic tape drive, an optical disk drive, an information storage device, etc. Removable storage drive 714 reads from and/or writes to a removable storage unit 718. Removable storage unit 718 represents a floppy disk, a magnetic tape, an optical disk, etc. which is read by, and written to, by removable storage drive 714. Removable storage unit 718 includes a computer usable storage medium having stored therein computer software and/or data.

In alternative embodiments, secondary memory 710 may include other similar devices for allowing computer programs or other instructions to be loaded into computer system 700. Such devices may include, for example, removable storage unit 718 and an interface 720. Examples of secondary memory 710 include a program cartridge and cartridge interface, a removable memory chip (such as an erasable programmable read only memory (EPROM), and/or programmable read only memory (PROM)) with an associated socket, and removable storage unit 718 and/or interface 720, which allow software and data to be transferred from removable storage unit 718 to computer system 700.

Computer system 700 may also include a communications interface 724. Communications interface 724 allows software and data to be transferred between computer system 700 and an external device 730. Examples of communications interface 724 may include a modem, a network interface (such as an Ethernet card), a communications port, a Personal Computer Memory Card International Association (PCMCIA) slot and card, etc. Software and data transferred via communications interface 724 are in the form of signals which may be electronic, electromagnetic, optical or other signals capable of being received by communications interface 724. These signals are provided to communications interface 724 via a communications path (e.g., channel) 726. Communications path 726 carries signals and may be implemented using wire or cable, fiber optics, a telephone line, a cellular link, a radio frequency (RF) link, and/or other communications channels.

In this document, the terms "computer program medium" and "computer usable medium" are used to generally refer to media such as removable storage drive 714, a hard disk installed in hard disk drive 712, and signals. These computer program products provide software to computer system 700. The invention is directed to such computer program products.

Computer programs (also referred to as computer control logic) are stored in main memory 708 and/or secondary memory 710. Computer programs may also be received via communications interface 724. Such computer programs, when executed, enable computer system 700 to perform the features of the present invention, as discussed herein. In particular, the computer programs, when executed, enable processor 704 to perform the features of the present invention. Accordingly, such computer programs represent controllers of computer system 700.

In an embodiment where the invention is implemented using software, the software may be stored in a computer program product and loaded into computer system 700 using removable storage drive 714, hard drive 712 or communications interface 724. The control logic (software), when executed by processor 704, causes processor 704 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

V. Conclusion

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract and Summary sections are not intended to limit the scope of the present invention in any way.

What is claimed is:

1. A method, comprising:
   receiving, by a computer system, an authorization request from a merchant for a transaction, wherein the authorization request indicates that the transaction has been initiated using a first transaction instrument corresponding to a user;
   based on the authorization request, the computer system determining a second transaction instrument corresponding to the user;
   the computer system analyzing transaction data for the transaction, wherein the analyzing includes determining whether the transaction data at least partially corresponds to particular transaction data associated with the second transaction instrument; and
   based on said analyzing, the computer system transmitting a response to the authorization request to the merchant, wherein the response indicates whether the transaction is authorized.

2. The method of claim 1, further comprising:
   based on the transaction data for the transaction sharing at least one identical data item with the particular transaction data associated with the second transaction instrument, the computer system determining that the transaction is authorized, wherein the response indicates that the transaction is authorized.

3. The method of claim 1, wherein the authorization request includes an identifier for the user, and wherein the second transaction instrument is determined based on the identifier.

4. The method of claim 1, wherein the transaction data for the transaction includes a user email address associated the transaction, and wherein the method further comprises the computer system determining the second transaction instrument based on the user email address.

5. The method of claim 1, wherein the authorization request includes a request to verify a shipping address associated with the transaction, and wherein the method further comprises:
   the computer system comparing the shipping address associated with the transaction to a particular shipping address associated with a transaction that has been conducted using the second transaction instrument; and
   based on a result of the comparing indicating that the shipping address associated with the transaction using the first transaction instrument is identical to the particular shipping address, the computer system authorizing the transaction.

6. The method of claim 1, wherein the response transmitted to the merchant is indicative of whether the transaction is fraudulent.

7. The method of claim 1, further comprising:
   in response to receiving the authorization request, the computer system determining an identification code associated with the first transaction instrument; and
   based on the identification code associated with the user, the computer system selecting the second transaction instrument corresponding to the user from a plurality of transaction instruments.

8. The method of claim 1, further comprising:
   based on validity information indicating that the transaction data for the transaction does not at least partially correspond to the particular transaction data associated with the second transaction instrument, the computer system determining a third transaction instrument corresponding to the user; and
   the computer system determining that the transaction is authorized based on other validity information indicating that the transaction data for the transaction at least partially corresponds to transaction data associated with the third transaction instrument.

9. The method of claim 1, further comprising the computer system calculating a transaction risk based in part on a result of analyzing the transaction data, wherein the transaction risk is indicative of a degree of correlation between the transaction data for the transaction using the first transaction instrument and the particular transaction data associated with the second transaction instrument.

10. The method of claim 1, further comprising the computer system receiving the transaction data from the merchant in association with the authorization request.

11. The method of claim 1, wherein the authorization request is received from a point-of-sale (POS) device having a wireless interface.

12. A computer system, comprising:
    a processor; and
    a memory having instructions stored thereon that are executable by the processor to cause the computer system to perform operations comprising:
    receiving first transaction information indicating that a first transaction has been initiated using a first transaction instrument of a user;
    determining second transaction information associated with a second transaction that has been conducted using a second transaction instrument of the user;
    determining whether the second transaction information and the first transaction information share at least one common data item; and
    transmitting verification information for the first transaction, wherein the verification information indicates whether the first transaction is authorized based on a result of said determining whether the first and second transaction information share the at least one common data item.

13. The computer system of claim 12, wherein the operations further comprise:
    comparing a plurality of data items included in the first transaction information and a plurality of data items included in the second transaction information; and identifying at least one data item included in the first transaction information, wherein the at least one data item is identical to a particular data item included the second transaction information.

14. The computer system of claim 12, wherein the operations further comprise receiving additional information indicating that the first transaction information is transmitted from one of: a point-of-sale device, a card reader, an RFID reader, an access point, a mobile device, a sales platform, or a website.

15. The computer system of claim 12, wherein the operations further comprise:
subsequent to transmitting the verification information for the first transaction, receiving payment information indicating that an amount for the first transaction has been deducted from an account associated with the first transaction instrument.

16. The computer system of claim 12, wherein the operations further comprise:
based on account information indicating that the first and second transaction information share an identical shipping address, authorizing a payment for the first transaction.

17. The computer system of claim 12, wherein the operations further comprise:
based on the first transaction information, identifying an account number associated with the user; and
identifying the second transaction instrument of the user using the account number.

18. The computer system of claim 12, wherein the first transaction information received includes at least one of: a name, a phone number, an address, a postal code, an e-mail address, an IP address, a complete social security number, or a partial social security number.

19. The computer system of claim 12, wherein the operations further comprise:
based on account information indicating that the first and second transaction information share a number of common data items, calculating a transaction risk based on the number of common data items.

20. The computer system of claim 12, wherein the operations further comprise:
after determining that the first and second transaction information do not share at least one identical data item, transmitting a denial of the first transaction to a seller associated with the first transaction.

21. The computer system of claim 12, wherein the operations further comprise:
receiving a request to verify a shipping address associated with the first transaction, wherein the shipping address is different from a billing address associated with the first transaction; and
based on the first and second transaction information sharing a plurality of common data items, wherein the plurality of common data items does not include the shipping address, transmitting a response to the request to verify indicating that the shipping address has been verified.

22. An article of manufacture including a non-transitory computer readable medium having instructions stored thereon that are executable by a computer system to cause the computer system to perform operations comprising:
receiving a request to authorize a payment to be charged to a transaction account, wherein the request includes a plurality of data items associated with the payment, and wherein a first portion of the plurality of data items is indicative of a user identity corresponding to the transaction account;
based on the first portion of the plurality of data items, determining a different transaction account;
comparing a second portion of the plurality of data items included in the request to at least a portion of data items associated with the different transaction account; and
generating a response to the request for the payment, wherein the response indicates whether the payment is approved based on a result of the comparing.

23. The article of manufacture of claim 22, wherein the operations further comprise:
based on a personal identification number included in the first portion of the plurality of data items, determining the different transaction account, wherein the personal identification number corresponds to the transaction account and the different transaction account.

24. The article of manufacture of claim 22, wherein the operations further comprise:
comparing a shipping address included in the second portion of the plurality of data items to a particular shipping address associated with the different transaction account; and
based a result of the comparing indicating that the shipping address is identical to the particular shipping address, generating an authorization of the payment request.

25. The article of manufacture of claim 22, wherein the operations further comprise:
based on the result of the comparing, calculating a risk factor indicative of a fraud risk level for the request to authorize the payment.

26. The article of manufacture of claim 22, wherein the operations further comprise:
in response to determining that the second portion of the plurality of data items includes at least one data item identical to at least one of the data items associated with the different transaction account, authorizing the request.

27. The article of manufacture of claim 22, wherein the operations further comprise:
based on account information indicating that the second portion of the plurality of data items included in the request does not correspond to any of the data items associated with the different transaction account, transmitting a response indicating that the request to authorize payment has been declined.

28. The article of manufacture of claim 22, wherein the result of the comparing indicates that the second portion of the plurality of data item includes one data item that partially corresponds to a particular one of the data items associated with the different transaction account, and wherein the operations further comprise:
based on the first portion of the plurality of data items, determining a third transaction account;
determining that the second portion of the plurality of data items included in the request includes at least one data item identical to a data item associated with the third transaction account; and
generating validity information indicating that the request to authorize payment has been approved.

29. The article of manufacture of claim 22, wherein the result of the comparing indicates that the second portion of the plurality of data items includes two or more data items in common with particular ones of the data items associated with the different transaction account, and wherein operations further comprise:

calculating a total correlation factor indicative of a degree of correlation between the two or more data items and the particular data items associated with the different transaction account.

30. The article of manufacture of claim 22, wherein the operations further comprise:

based on the result of the comparing indicating that the second portion of the plurality of data items include at least one data item identical to one of the data items associated with the different transaction account, determining that the payment be deducted from a balance of the transaction account.

\* \* \* \* \*